United States Patent [19]

Beck

[11] Patent Number: 5,101,685

[45] Date of Patent: Apr. 7, 1992

[54] LIMITED SLIP DIFFERENTIAL USING A CONTINUOUS WORM GEAR

[76] Inventor: Robert C. Beck, Rte. 1, Box 64RB, Conover, N.C. 28613

[21] Appl. No.: 708,773

[22] Filed: May 25, 1991

Related U.S. Application Data

[63] Continuation-in-part of Ser. No. 562,818, Aug. 6, 1990, abandoned.

[51] Int. Cl.⁵ .............................................. F16H 35/04
[52] U.S. Cl. ...................... 74/650; 475/183; 475/184; 475/189; 475/196; 475/197
[58] Field of Search ............... 475/183, 184, 189, 196, 475/197, 220, 242, 248, 249; 74/650, 198

[56] References Cited

FOREIGN PATENT DOCUMENTS 736494 6/1943 Fed. Rep. of Germany .
59-180153 10/1984 Japan .................................... 475/196

OTHER PUBLICATIONS

Gleason's Impossible Differential, Popular Science, Feb., 1984, pp. 58, 59, 60, and 61, Author: Mike Bargo.

Primary Examiner—Leslie A. Braun
Assistant Examiner—Daniel Wittels
Attorney, Agent, or Firm—Roy B. Moffitt

[57] ABSTRACT

A differential gear that includes a cage in which there is disposed first and second rotatable cylinders positioned adjacent to one another, each rotatable cylinder having an elliptically-shaped groove in its surface and a sphere in each groove in contact with the cage as the cylinders are rotated. The first and second rotatable cylinders are rotatable only in opposite directions.

20 Claims, 4 Drawing Sheets

LIMITED SLIP DIFFERENTIAL USING A CONTINUOUS WORM GEAR

CROSS REFERENCE TO RELATED INVENTIONS

This application is a continuation-in-part of United States patent application No. 07/562,818, filed Aug. 6, 1990, now abandoned entitled "Differential Gear".

BACKGROUND OF THE INVENTION

This invention is a new type of differential gear. Differential gears are well known and are typically found in automobiles, buses, riding lawnmowers and other land type vehicles. There was a time when the typical differential gear did not function satisfactorily if one wheel of a vehicle lost traction and the other did not. Because the wheel with traction stopped turning and the wheel without traction continued to turn, just the opposite of what was desired. Prior art differential gears are designed so that one half axle and bevel gear turns faster than the opposite slower turning half axle and bevel gear so as to accommodate the vehicle turning a corner. Recently, there have been marketed two designs of a differential gear employing the one way action of a worm gear to limit such slippage, in other words a limited slip gear.

In these two recent designs, as with most any other differential gear, the power of the engine is transferred to a differential housing via a ring gear. One of these new differential gear designs, see *Popular Science*, February, 1984, Pages 58-61, which uses a pair of worm wheels (from two to three pairs, depending on the size of the differential) mounted on the differential housing to turn the worm gears splined to an axle shaft. One worm wheel of each pair turns the left axle shaft and the other worm wheel turns the right axle shaft.

Because the worm wheel cannot turn the worm gear, it locks on the gear and turns the axle shaft, propelling the vehicle forward during non-turning travel. The right and left axle shafts (in right and left wheels) turn simultaneously. Each wheel then rotates at the same speed. When a vehicle makes a turn, each wheel rotates at a slightly different RPM. For example, during a left turn, the left wheel will slow down by two RPM's and the right wheel will speed up by two RPM's. One axle shaft always slows down at the exact rate that the other speeds up. This difference in RPM is transferred to the worm wheels because the worm wheels on the axle shaft can turn the worm wheel and equalize the other side via a 1:1 spur gears, which act as balancing gears. Thus, the engine is "locked" or engaged on the axle shaft while allowing for differential action when negotiating turns The differential gear of the instant invention is more simple in construction. It does not have a worm gear; it has a cage delimiting a space in which two juxtaposed colinear rotatable cylinders are disposed. In each cylinder, there is an elliptically shaped groove and in each groove there are two spheres. The cage is so constructed so that each sphere is in contact not only with each rotatable cylinder, but also with the cage as well. Part of a given sphere is partly in an eliptical groove of one rotatable cylinder and partly in the eliptical groove of the other rotatable cylinder. Each sphere remains in such contact, as the rotatable cylinder is rotated, and travels the route delimited by the elliptical groove of a given rotatable cylinder. The elliptical path of the grooves and the two spheres perform the function of an endless worm gear and is the basis for the limited slip properties of this gear.

DETAILED DESCRIPTION OF THE INVENTION AND PREFERRED EMBODIMENTS

Figure 1:
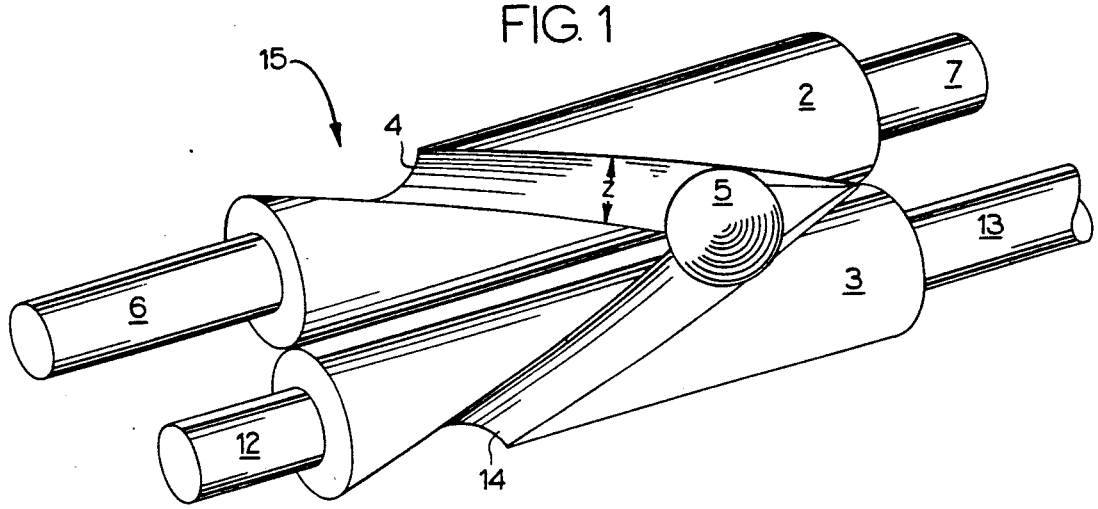
FIG. 1 is a prospective generalized view of the two rotatable cylinders and one of the two spheres used in one embodiment of the present invention.

Shown as element 15 in FIG. 1 is a sub-assembly of the invention, composed of first and second rotatable cylinders 2 and 3 positioned side by side in a juxtaposed relationship to one another. First rotatable cylinder 2 has in it first elliptical groove 4 and likewise second rotatable cylinder 3 has in it second elliptical groove 14. It will be noted that first and second elliptical grooves 4 and 14 communicate with one another as rotatable cylinders 2 and 3 are rotated and both contain a portion of first and second spheres 5—5, see FIG. 3. First sphere 5's route of travel is delimited by first elliptical groove 4 and second elliptical groove 14. Second sphere 5's, (not shown because it is on the back side of the sub-assembly 15, see FIG. 4, route of travel is also delimited by first and second elliptical groove 4 and 14. First rotatable cylinder 2 is affixed to short axle 7 on one terminal end and to extended axle 6 on the other terminal end. Second rotatable cylinder 3 is affixed to extended axle 13 on one terminal end and short axle 12 on the opposite terminal end.

Figure 2:
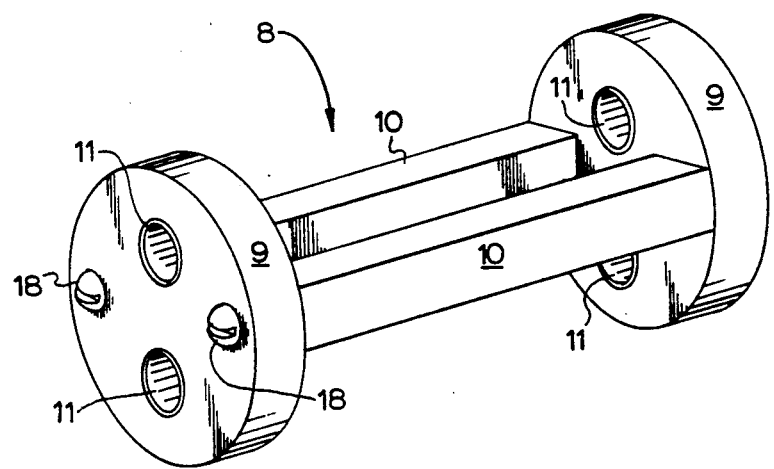
FIG. 2 is a prospective view of one embodiment of a cage in which the rotatable cylinders of FIG. 1 and two spheres are disposed.
Figure 3:
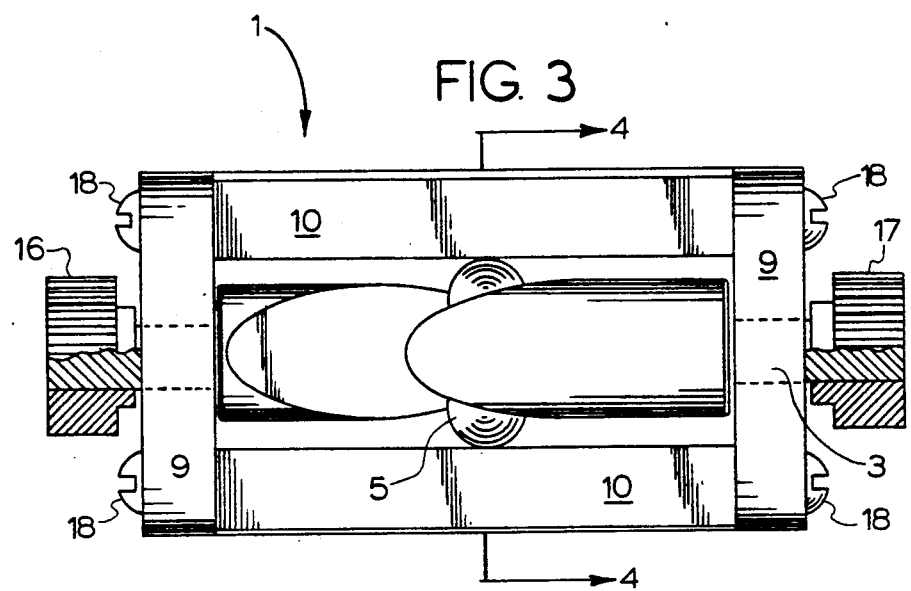
FIG. 3 is a side elevation view of the assembly of the rotatable cylinders, two spheres and cage of FIGS. 1 and 2.
Figure 4:
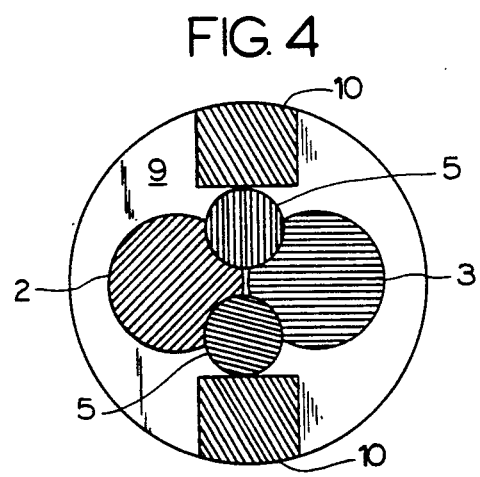
FIG. 4 is a cross sectional view of the assembly of FIG. 3 along the line 4—4.

Element 8 of FIG. 2 is a cage in which sub-assembly 15 is disposed forming an assembly shown as element 1 of FIG. 3. Cage 8 is made up of two terminal ends 9—9 containing apertures 11—11 in which axles 6, 7, 12, and 13 are fitted. It is to be noted that cage 8 is made up of cross members 10 affixed to end members 9 by screws 18. Welding may be employed to secure end members 9 to cross members 10, once rotatable cylinders and sphere's 5 are in place as shown. In sub-assembly 15, axle portion 13 is longer than axle portion 12 and axle portion 6 is longer than axle portion 7. The terminal portion of axle portion 12 may fit flush with the face of terminal end 9 and terminal face of axle portion 7 may fit flush with the opposite terminal end 9. Axle portions 6 and 13 protrude beyond the terminal free edge of terminal end portions 9—9 respectively forming a rotatable protrusion on which a tooth gear or universal joint may be affixed as shown by elements 16 and 17 of FIG. 3 and elements 25—25 of FIG. 8. Terminal end members 9 are spaced apart from each other but are joined to one another by bars 10 and screws 18 to form cage 8. There are two bars 10—10 spaced apart approximately 180° from one another.

As rotatable rollers 2 and 3 are rotated about their axles 6, 7, 12, and 13, spheres 5—5 are retained in elliptical grooves 4 and 14, traversed about a path delimited by the elliptical grooves and constrained by bars 10—10 in an obvious manner. For example, as rotatable cylinders 2 and 3 are rotated in opposite directions, spheres 5—5 are constantly in contact with bars 10—10, moving left to right and right to left as they traverse grooves 4 and 14. Spheres 5—5 are always in contact with both rollers 2 and 3 and one of bars 10—10, as they travel about elliptical paths defined by elliptical grooves 4 and 14, and they are always on opposite sides of a cylinder from each other at any given time. See FIG. 4. If rotatable cylinders 2 and 3 of assembly 1 are rotated in opposite directions, spheres 5—5 remain opposite each other and parallel to bar 10, allowing spheres 5—5 to move smoothly from end to end in a straight line while traveling in an elliptical path relative to grooves 4-14. An attempt to rotate rotatable cylinders 2 and 3 in the same direction demands a misalignment of grooves 4 and 14, but alignment is mandated by spheres 5—5 and is restricted to the end to end motion of spheres 5—5 previously decribed. Thus, an attempt to rotate rotatable cylinders 2 and 3 in the same direction is not possible. More about this feature will follow.

Figure 7:
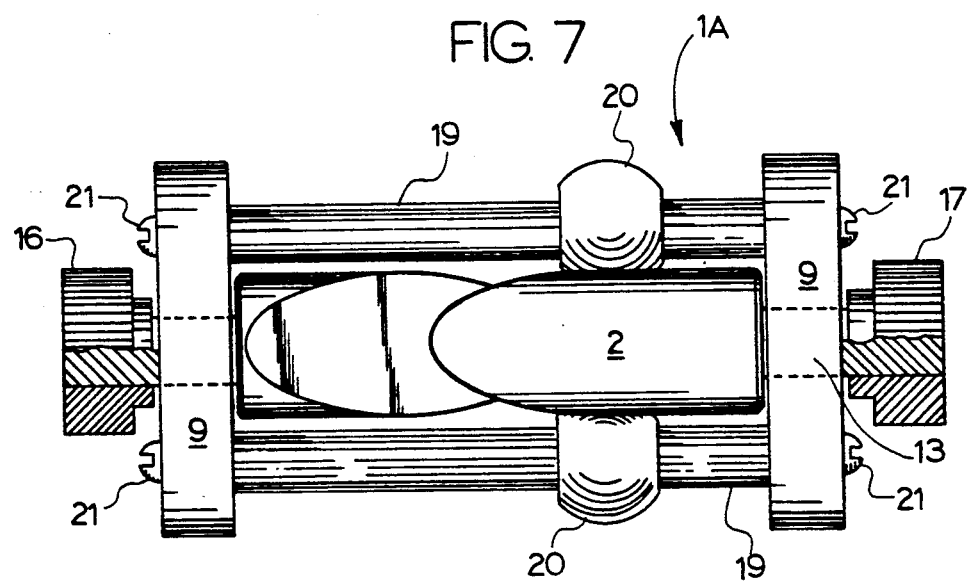
FIG. 7 is a side elevation of an assembly of the embodiment referred to in FIG. 6 including rotatable cylinders and two rotatable and slidable spheres, one each threaded on rod-like, cross members.

FIG. 7 is another embodiment of the invention in which part of cage 8A comprises round rods 19 and 19. Pierced sphere 20 has a passageway through it so that it may be slidably threaded on a rod 19. It is also rotatable about the longitudinal axis of rod 19.

Rods 19 and 19 perform the same functions as bars 10 and 10 providing support and spacing for terminal ends 9—9 and confinement of spheres 5—5. See FIG. 7. Spheres 20—20 perform the same function as spheres 5—5, they rotate around the longitudinal axis of rod 19 and are slidable along rod 19 between the inntermost surfaces of end members 9—9. This embodiment provides better wear resistance under severe pressure and retains the slip limiting abilities of the invention.

As rotatable rollers 2 and 3 are rotated, pierced spheres 20—20 are retained in elliptical grooves 4 and 14 and traversed about these elliptical grooves. They are constrained by bars 19—19 in an obvious manner and are constantly in contact with bars 19—19, moving left to right and right to left as they traverse grooves 4 and 14. Spheres 20—20 are always in contact with both rollers 2 and 3 and one of bars 19—19, as they travel about elliptical paths defined by elliptical grooves 4 and 14, and they are always on opposite sides of a cylinder from each other at any given time. See FIG. 7. If rotatable cylinders 2 and 3 of assembly 1A are rotated in opposite directions, spheres 20—20 remain opposite each other and parallel to bar 19, allowing spheres 20—20 to move smoothly from end to end in a straight line while traveling in an elliptical path. An attempt to rotate rotatable cylinders 2 and 3 in the same direction demands a misalignment of grooves 4 and 14, but alignment is mandated by spheres 20—20 and is restricted to the end to end motion of spheres 20—20 previously described. Thus, an attempt to rotate rotatable cylinders 2 and 3 in the same direction is not possible.

Figure 5:
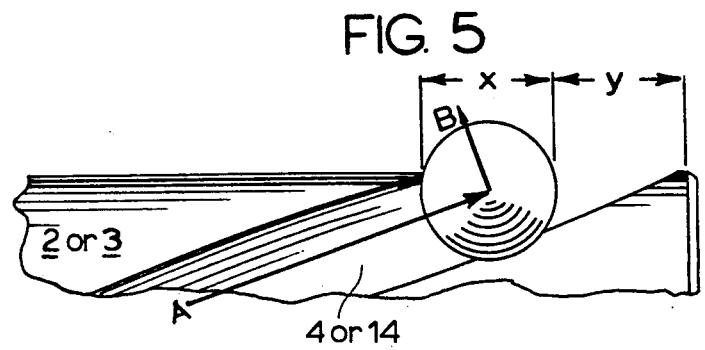
FIG. 5 is a prospective view of the details of the elliptical groove in the rotatable cylinders and one of the spheres of FIGS. 1-4, showing lines of force applied to the sphere as it changes its direction of travel.
Figure 6:
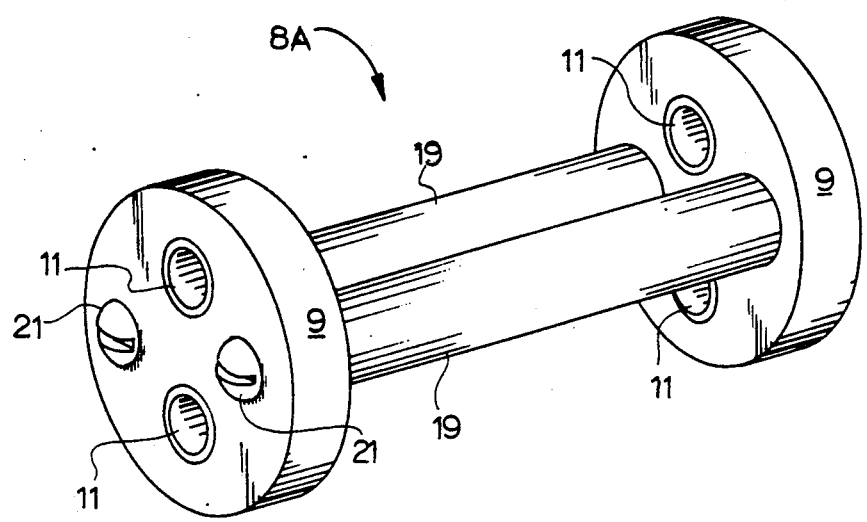
FIG. 6 is a prospective view of a cage of another embodiment of the invention, having rod-like instead of rectangular3 cross members.

Reference is made to FIGS. 3 and 7. When a rotatable force is applied to axles 6 and 13, one in one direction and one in the opposite direction, both rotatable cylinders 2 and 3 will rotate, with both spheres 5—5 or 20—20 moving right to left and then left to right. Any given sphere 5 or 20 is always in contact with a given bar or rod as the case may be, during its right to left and left to right travels. Always, a part of any sphere is in both grooves 4 and 14 and traversing a half of the elliptical path defined by grooves 4-14 in its left hand travel and the other half in its right hand travel. The same action also takes place if the direction of rotation of axles 6 and 13 are reversed. When axles 6 and 13 are subject to rotational forces that are in the same direction, not opposite, then the gear system "locks", i.e., axles 6 and 13 can not be rotated, because one groove is forced against the other in opposite directions via sphere 5 or 20. In this state, only the entire cage can rotate. In the embodiment shown in FIG. 3, a locking action also arises out of the state where there is no traction on one of the rotatable cylinders, but there is traction on the other rotatable cylinder. While there is opposite rotatable forces on axles 6 and 13 respectively, spheres 5 do not lock up because spheres 5 are being constantly pushed along their respective elliptical paths, i.e., the elliptical grooves. If the spheres are at a position as shown in FIG. 5 and the cage is rotated with traction on only one axle, the cylinders lock up. There is no rotation of rotatable cylinders 2 or 3. The whole assembly would have to rotate. If, in such a state the cage is rotated, the spheres 5 would move to the right or left hand distal position (position X) and rotatable cylinders 2 and 3 would lock up (no rotation) except that the whole assembly would have to rotate. This is discussed further in description of FIG. 5.

This above description simulates the case when there is no traction on a wheel connected to the axle to which no rotational force is applied, e.g., no traction. In this "locked" state (rotational force on one axle only), spheres 5 or 20 are at the distal end of their elliptical grooves. Rotating axle 13 clock wise moves spheres 5 or 20, if they are to the extreme right hand position, from right to left, where they work against one another and lock up the gear. If spheres 5 or 20 are to the extreme right, axle 13 cannot be rotated counter clockwise. The reverse is true for axle 6.

In most prior art differential gears, if one wheel looses traction, the wheel with traction stops and the one without traction speeds up. In the gear of the present invention, its one-way action is used to limit this slip-page. The elliptical paths 4-14 functionally form an endless worm gear and such in combination with spheres 5—5, 20—20, and cage 8—8A form the basis for the limited slip properties of the invention.

Reference is made to FIG. 5 wherein there is shown details of grooves 4-14. Viewing FIG. 5, it will be noted that a part (distal end) of each elliptical groove 4-14 has a dimension greater than the diameter of the sphere that is assigned to it and traverses its path. Diameter of sphere 5 is X, but distal end of groove 4 or 14 has a dimension of distance X+Y. The balance of the groove is sufficiently wide (Z) and the diameter of sphere 5 is of such size that a part of sphere 5 rotatably fits in it and is able to be traversed over the groove's path. The distal end, as above described, creates a locking action (or mode) when either rotatable cylinder 2 or 3 is in a no traction situation. When sphere 5 encounters and enters such an area, it changes its direction of force from primarily "A" to primarily "B" and has a tendency to be directed obliquely against the cage and the groove of the cylinder with no torque. This action "locks" the differential if one axle is producing no force. This funciton is applicable only to the embodiment as shown in FIG. 3.

Element IA of FIG. 7 is a cage in which rotatable rollers 2-3 and pierced spheres 20—20 are disposed forming an assembly. Cage 8A is made up of two terminal ends 9—9 containing apertures 11—11 in which axles 6, 7, 12, and 13 are fitted as in sub-assembly 15, axle portion 13 is longer than axle portion 12 and axle portion 6 is longer than axle portion 7. The terminal portion of axle portion 12 fits flush with the face of terminal end 9 and terminal face of axle portion 7 fits flush with the opposite terminal end 9, as shown by element 1 of FIG. 3. Axle portions 6 and 13 protrude beyond the terminal free edge of terminal end portions 9—9 respectively forming a rotatable protrusion on which a tooth gear or universal joint may be affixed as shown by elements 16 and 17 of FIG. 7 and elements 25—25 of FIG. 8. Terminal ends 9 are spaced apart from each other but are joined to one another by rods 19 and screws 21 to form cage assembly 8A. Rods 19—19 spaced apart approximately 180° from one another.

Figure 8:
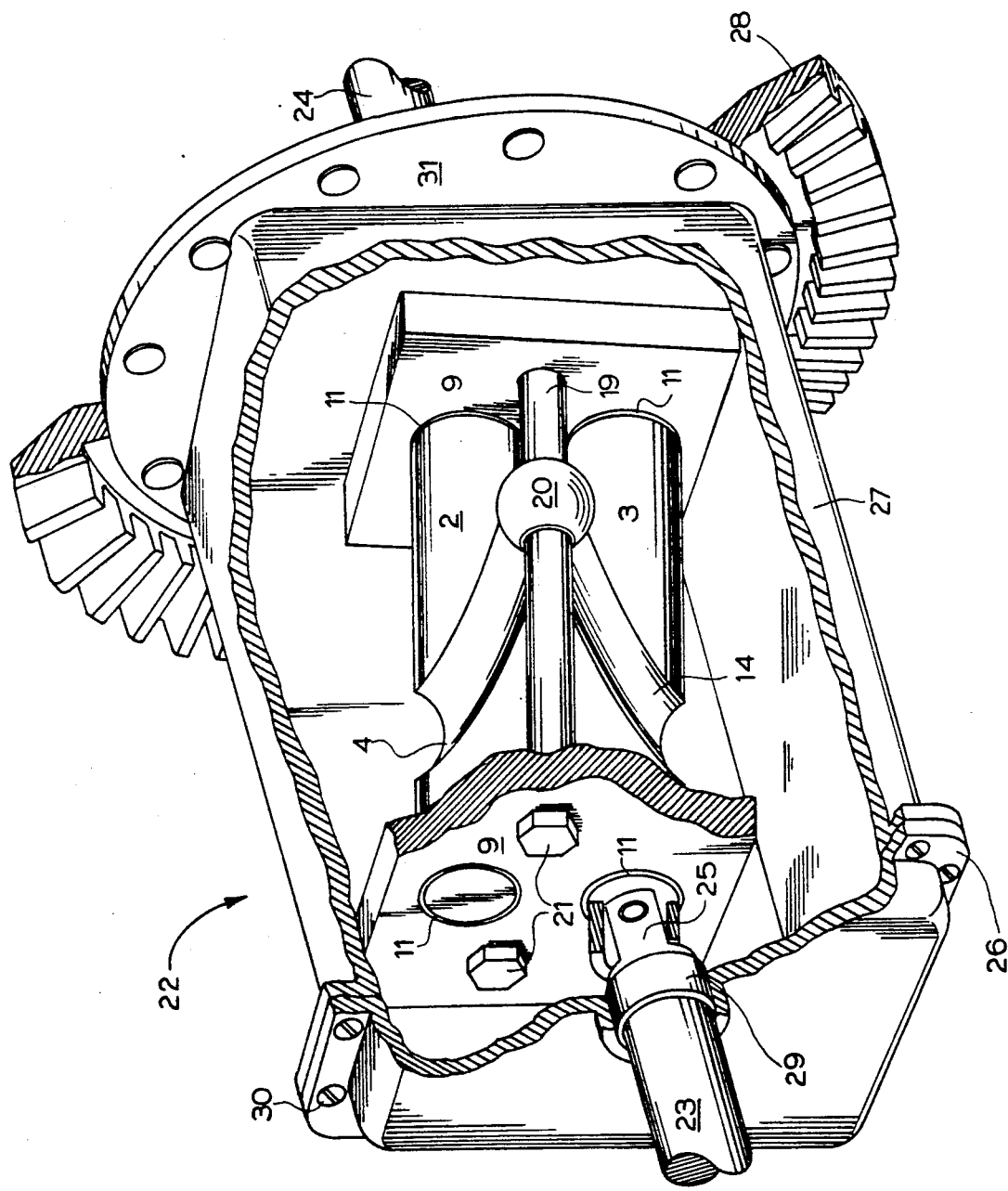
FIG. 8 is a prospective cut-a-way view of a differential gear assembly employing the embodiment of FIG. 7 in a drive train.

Shown by element 22 of FIG. 8 is a cut-away perspective view of the differential gear of the invention in its intended environment. Axles 23 and 24 represent half axles to which wheels of a car or vehicle (not shown) are attached. Axle 23 is attached by universal joint 25 to roller 3 and axle 24 in like manner to roller 2 (universal not shown). The cage of this embodiment is of the type shown in FIG. 7 having the terminal ends 9—9 squared so as to be slidably inserted into the squared housing 27. It is to be understood, however, that the assembly 1 of FIG. 3 could be substituted therefore. The cage assembly is comprised of terminal ends 9—9, round rods 19—19 and cap screws 21. Into this cage are inserted rollers 2-3 and pierced spheres 20—20 (one not shown) forming the embodiment shown in FIG. 7. Housing 27 has a cover 26 secured by screws 30 and contains an aperture 29 to receive axle 23. The other end of housing 27 has a flange, to which is affixed ring gear 28, and contains an aperture (not shown) to receive axle 24. Power is delivered to differential gear 22 from the vehicles engine by means of a drive shaft and pinion gear (not shown) in a well-known manner. Power is transferred from this ring gear 28 to housing 27, through cage end members 9—9 to rods 19—19 and pierced spheres 20—20, and thence to rollers 2-3 and their extensions, axles 23-24. Power is applied equally to the axles 23-24 and so long as the travel is straight ahead, rollers 2-3 are locked in position. If a turn is made and axles 23-24 are forced to assume different speeds they are then effectively turning in opposite directions and therefor rotate rollers 2-3 allowing the differential action to take place. As power is delivered to rollers 2-3 through pierced spheres 20—20 to their elliptical grooves 4-14, it is constant regardless of their relative position while rotating. In the event of a low traction situation, power is exerted by pierced spheres 20—20 against the roller 2 or 3 and its associated elliptical groove 4 or 14 that retains traction. Because this power is applied at an acute angle to the groove 4 or 14 by spheres 20—20 and because, at the same time, spheres 20—20 must also effect a rotation of the opposite roller 2 or 3, if they are to move laterally along their bars 19—19, a high mechanical advantage ratio is created. This mechanical advantage is in favor of the axle with no traction and is the basis for the limited slip capabilities of the present invention.

In all cases it is to be understood that the above described preferred embodiment is illustrative of one of the many possible specific embodiments which may represent the principals of my invention. Numerous and various other embodiments can be devised readily in accordance with these principals by those skilled in the art without departing from the spirit and scope of the invention.

What is claimed is:

1. A differential gear comprising a cage delimiting a space in which there is disposed:
   (a) a first rotatable cylinder having a first elliptically-shaped groove therein circumscribing said first rotatable cylinder;
   (b) a second rotatable cylinder having a second elliptically-shaped groove therein circumscribing said second rotatable cylinder, said first and second elliptically-shaped grooves in communication with one another;
   (c) a first sphere, at least partly disposed in and movable along said first and second elliptically-shaped grooves, in contact with said cage and a second sphere at least partly disposed in and movable along said first and second elliptically-shaped grooves in contact with said cage, whereby said first and second rotatable cylinders are rotatable only if they are rotated in opposite directions.

2. The differential gear of claim 1 wherein said cage includes first and second spaced apart end members and a terminal portion of said first and second rotatable cylinders are rotatably journaled in said first and second spaced apart end members.

3. The differential gear of claim 1 whereby said first and second spheres are on opposite surfaces of said rotatable cylinders.

4. The differential gear of claim 1 including a first axle affixed to said first rotatable cylinder and a second axle affixed to said second rotatable cylinder.

5. The differential gear of claim 1 wherein said first and second rotatable cylinders are disposed side by side.

6. The differential gear of claim 1 wherein a portion of the first and second elliptical grooves have a dimension greater than the diameter of either the first or second spheres.

7. The differential gear of claim 2 further including first and second spaced apart bar members disposed between and affixed to said end members and positioned approximately 180° from one another, said bar members being that part of the cage which said first and second spheres are in contact.

8. The differential gear of claim 4 further including a first gear attached to said first axle and a second gear attached to said second axle.

9. The differential gear of claim 1 wherein at least part of said cage is composed of first and second rods disposed essentially parallel to said first and second cylinders, at least one of said first and second spheres has a passageway through it, and at least one of said first and second spheres is rotatably and slidably threaded onto at least one of said first and second rods.

10. A differential gear comprising:

(a) a housing;
(b) a ring gear affixed to said housing;
(c) first and second axles rotatably journaled in said housing each being affixed to respectively first and second universal joints;
(d) a cage in which there is disposed:
  (i) a first rotatable cylinder having a first elliptically-shaped groove therein circumscribing said first rotatable cylinder;
  (ii) a second rotatable cylinder having a second elliptically-shaped groove therein circumscribing said second rotatable cylinder, said first and second elliptically-shaped grooves in communication with one another;
  (iii) a first sphere, at least partly disposed in and movable along said first and second elliptically-shaped grooves, in contact with said cage and a second sphere at least partly disposed in and movable along said first and second elliptically-shaped grooves in contact with said cage, whereby said first and second rotatable cylinders are rotatable only if they are rotated in opposite directions; and,
(e) said first universal joint of said first axle affixed to said first rotatable cylinder and said second universal joint of said second axle affixed to said second rotatable cylinder.

11. The differential gear of claim 10 whereby said spheres in the elliptical grooves of said rotatable cylinders are on opposite surfaces of said rotatable cylinders.

12. The differential of claim 10 wherein said first and second rotatable cylinders are disposed side by side.

13. The differential gear of claim 10 wherein a portion of the first and second elliptical grooves have a dimension greater than the diameter of either the first or second spheres.

14. The differential gear of claim 10 wherein said cage contains first and second spaced apart end members and a terminal portion of said first and second rotatable cylinders are rotatably journaled in said first and second spaced apart end members.

15. The differential gear of claim 10 wherein the elliptical groove of said first elliptically shaped groove is in communication with said second elliptically shaped groove.

16. The differential gear of claim 10 wherein said cage includes first and second spaced apart end embers and a terminal portions of said first and second rotatable cylinders are rotatably journaled in said first and second spaced apart end members.

17. The differential gear of claim 10 wherein said cage contains first and second rod members affixed to and in between said first and second spaced apart end members and at least one of said first and second spheres has a passageway there through and at least one of said first and second spheres is rotatably and slidably threaded onto at least one of said first and second rod members.

18. The differential gear of claim 16 further including first and second spaced apart rod or bar members disposed between and affixed to said end members and positioned approximately 180° from one another, said rod or bar members being that part of the cage which said first and second spheres are in contact.

19. The differential gear of claim 17 wherein said first sphere is slidably and rotatably threaded onto said first rod and said second sphere is slidably and rotatably threaded on said second rod.

20. The differential gear of claim 9 wherein both of said bar members are rods and said first sphere is slidably and rotatably threaded on said first rod and second sphere is slidably and rotatably threaded on said second rod.

* * * * *